Feb. 6, 1962  H. J. DAUGHERTY ETAL  3,019,680
JAW OPERATING STRUCTURE FOR PIPE WRENCH
Filed April 27, 1959  2 Sheets-Sheet 2

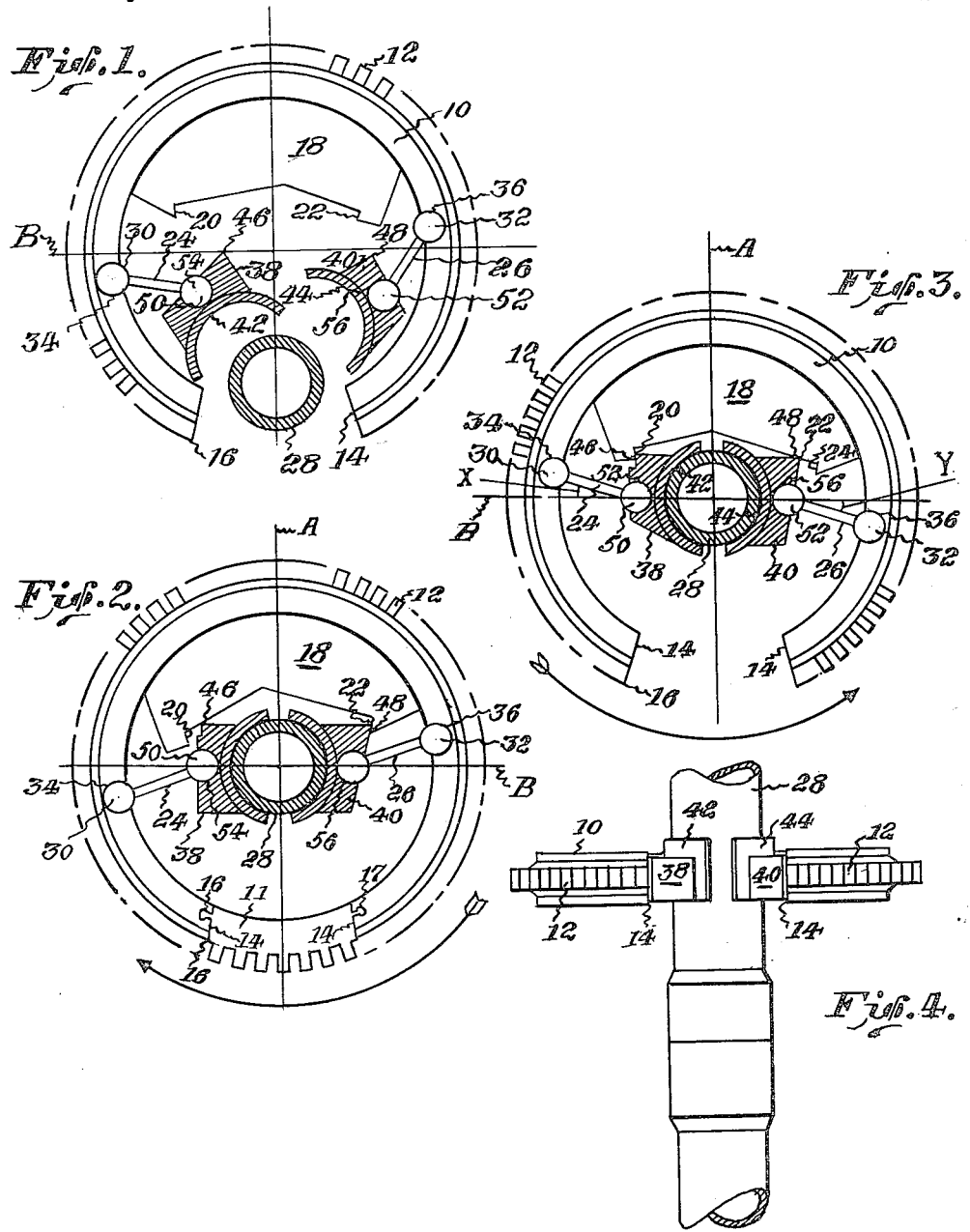

INVENTORS
HENRY J. DAUGHERTY
ROBERT E. MAXWELL

BY *Mason, Mason & Albright*
ATTORNEYS

United States Patent Office 3,019,680
Patented Feb. 6, 1962

3,019,680
JAW OPERATING STRUCTURE FOR
PIPE WRENCH
Henry J. Daugherty, 11401 Roth Drive, and Robert E.
Maxwell, 745 Wainwright, both of Houston, Tex.
Filed Apr. 27, 1959, Ser. No. 809,168
13 Claims. (Cl. 81—53)

The present invention relates to a device for applying and releasing pressure to a cylindrical member such as a tube, cylinder or drum. It may be used for clutching relatively movable parts to each other, or for applying a braking or retarding force from one member to another member. Its greatest application, however, relates to its use as a gripping device for casings or pipes, and in the latter case for unscrewing and screwing oil well tubing or drill pipe, or casing and the like. It may also be used for loosening or "breaking" pipe or tubing joints without injury or deformation of the pipe tubing or couplings.

An object of the invention is to utilize a system of two or more levers so that power delivered in a rotational direction is re-directed by said levers in such a manner that a gripping action is developed between the apparatus and a cylindrically shaped member.

A further object is to adjust the geometrical relationship of said levers to the centerline of the gripped member so that the gripping force which is developed may be automatically increased or decreased so that the frictional forces present between the two surfaces can be utilized to such a degree as to make the use of a penetrating type face on the gripping member optional.

An object of the invention therefore is to provide a positive gripping device for a cylindrically shaped member, such as a pipe, tube or drum, including lever means whereby to apply a tight grip to said cylindrical member, and to regulate the amount of gripping force applied to said member.

Another object is to employ gripping force on a cylindrical object, as a pipe, tube or drum by exerting pressure through lever means to said object and transmitting additional pressure through said lever means by a supplemental force applying means such as by a locking block mounted on the same rotary member which supports the lever means.

A further object is the provision of a device having separate gripping members and actuating levers therefor, for more effectively coupling two parts together, and means to apply optimum torque leverage thereby in the operation of breaking loose the threaded joints of a pipe tubing. An additional object is to provide a device for breaking pipe joints that will eliminate the necessity of hammering the pipe joint to assist in breaking the joint, thus obviating possible injury to the threads of the joint.

A further object is to provide maximum gripping surfaces for engagement with the pipe or casing without increasing the over-all size of the gripping apparatus.

Yet an additional object is to provide a means for gripping pipe or casing, for rotating the same in one direction, and for locking the parts in such position, and for gripping the pipe or casing for rotation in the opposite direction and for locking the parts during such opposite rotation.

An additional object is to provide a device of the kind described wherein leverage means is provided for automatically increasing the gripping action on the cylindrical member as the gripping members engage the cylindrical member.

Other objects will appear hereinafter in the specification taken with the appended drawings, wherein:

FIGURE 1 is a top plan view of the device minus the driving means therefor, showing the gripping members in disengaged position with relation to the cylindrical member;

FIGURE 2 is a view similar to FIGURE 1, but showing the gripping members in engagement with the cylindrical member when the gripping members are moving in a clockwise direction;

FIGURE 3 is a view similar to FIGURE 2 with the gripping members moving in a counterclockwise direction;

FIGURE 4 is a side elevational view of the structure shown in FIGURE 2;

While the invention has general application to various types of apparatus wherein gripping means is provided for engagement with another member of cylindrical cross section as in clutches or brakes as set out above, it will be described for illustrative purposes in connection with oil well apparatus including mechanism for rotating casings or drill pipes in either direction. As such it may be used with slips or in substitution thereof in a rotary drill table, or incorporated as the gripping mechanism for screwing or "breaking," i.e., unscrewing pipe sections in casing and pipe tongs or wrenches.

Figure 5:
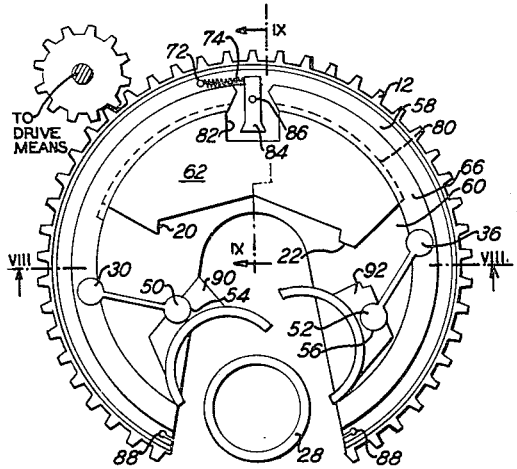
FIGURE 5 is a top plan view of a second embodiment of the device showing the jaws in open position.

Referring now to the drawings, 10 shows a ring provided with teeth 12 and having an opening 14, or the ring and chain drawing mechanism may be as indicated in FIGURE 5 of the Province Patent No. 2,780,950, February 12, 1957. When using a split ring, a section, preferably having teeth, may be pivoted on one of the sides so as to swing outwardly when it is desired to open the ring to allow the ring 10 to surround the pipe 28 or move the ring to a position where it will no longer surround the cylindrical member. In place of the pivoted section, a tongue and groove, or dovetailed groove construction may be provided to lock the removable section of the ring, or the ring may be composed of sections pivoted to each other as shown in the Buttress Patent No. 1,902,216, March 21, 1933, the ring section being shown at 11 and the tongue and groove constructions at 16 and 17 herein.

All of the above constructions are prior art conventional ones for a ring of the type to be used with the present invention, and hence have not been shown as they are interchangeable and any one of them may be used by those skilled in the oil well drilling art.

Any suitable prime mover not shown may be provided, such as that shown in FIGURE 2 of the patent to Grable, No. 2,311,225, and the device used as an open ring type of pipe rotating means as indicated in FIGURE 3 of the Grable patent.

As will be apparent from an inspection of the construction illustrated in the several FIGURES 1–4 herein, the present invention is particularly concerned with the gripping means in either an open ring 10 as shown having teeth 12, or a closed ring pipe rotating device, utilizing various types of prime movers for rotating the gripping means in a clockwise or counterclockwise direction. See FIGURES 2 and 3.

Fixedly mounted on the inner periphery of the ring 10, and preferably opposite to the opening 14, should there be such, is a locking block 18 having holding or locking means illustrated as notches 20 and 22. It will be understood that should it be desired to rotate the pipe in only one direction only one locking means need be provided on the locking block 18. Mounted preferably adjacent to the inner periphery of the ring 10 at substantially 180° from each other are a pair of levers 24 and 26 whose bases 30 and 32 are cylindrical in cross-section and are rotatably or oscillatably mounted in cylindrical sockets 34 and 36, respectively, in the ring 10. The inner ends of the heads 50 and 52 are provided with blocks or shoes 38 and 40, whose facing engaging surfaces 42 and 44 may or may not be provided with teeth depending upon the construction of the cylindrical tubing or pipe which is to be gripped by said surfaces.

The block 38 is provided with a complementary holding or locking means, shown as a shoulder 46 for engagement with the holding means 20, where the ring is rotated in one direction with the block friction surfaces in engagement with the pipe 28; and block 40 has a holding means such as shoulder 48 for engagement with holding means 22 when the ring is rotated in the opposite direction. These two positions of rotation of the ring, i.e. of the blocks and several holding means, are illustrated in FIGURES 2 and 3 of the drawings.

The blocks 38 and 40 are affixed to the levers 24 and 26, respectively, by using heads 50 and 52 that are cylindrical in cross-section and which are held in cylindrical sockets 54 and 56. These heads and sockets are preferably structurally the same as the bases 30 and 32 in their sockets 34 and 36.

In any case, the levers are free to pivot within limited arcs in sockets 34 and 36, as are the blocks 38 and 40 in their sockets 54 and 56.

It will be understood that the engaging surfaces 42 and 44 are of the same or substantially the same radius of curvature as the radius of curvature of the pipe 28 which is adapted to be engaged by said surfaces 42 and 44.

It will be noted that the line A which bisects the opening 14, is at right angles to the line B, and that the sockets 34 and 36 lie below and above said line B, respectively. Hence, the force exerted against the blocks 38 and 40 is increased by the location of the bases 30 and 32 of the levers on opposite sides of the line B when the ring is rotated in either direction with the parts as shown in FIGURE 2 or FIGURE 3. By utilizing this structural arrangement, the amount of force or grip on the pipe will be automatically adjusted to prevent slippage of the pipe, especially when the locking block 18 is connected directly to the ring 10 driven by the prime mover.

Referring now to the second form of the invention disclosed in FIGURES 5 to 9, the ring, the support for the shoes, and the locking block are separately movable relative to each other.

The ring is indicated at 58, having teeth or other means by which the ring may be driven. The ring 58 is supported on a bowl 60. The locking block 62 is supported for a limited rotary movement relative to the bowl 60 by means of the tongue 78 and groove 80 connection. The bowl 60 is provided with an upper peripheral portion 66, as seen in FIGURE 7, having a tongue 68, and the ring 58 is provided with a groove 70 which fits over the tongue 68.

Figure 7:
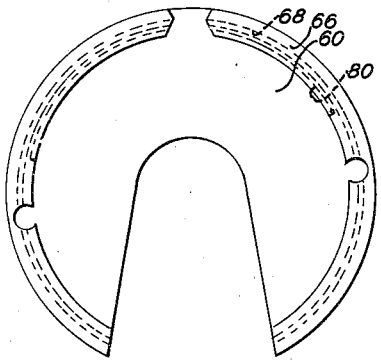
FIGURE 7 is a top plan view of the bowl.
Figure 8:
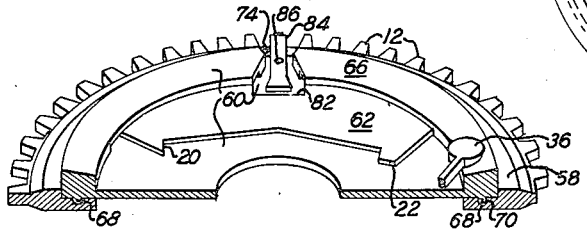
FIGURE 8 is a perspective section on line VIII—VIII of FIGURE 5.

It will be understood that a cover plate, not shown, may be placed over the bowl 60, the cover plate being of substantially the same shape as the bowl, as seen in FIGURE 7, except that the lever supporting groove and the cam, the latter to be hereinafter described, have been omitted.

There is a projection 72 on the ring 58 which extends partially over the bowl and forms a seat for one end of a spring 74. The opposite end of this spring engages a lever or cam member 84. The locking block 62 is provided with a tongue 78 which engages in a groove 80 of the ring. It will be understood that the groove 80 is slightly longer at both ends than the tongue 78 so as to allow a limited amount of movement only of the locking block 62 relative to the bowl 60. The bowl 60 is provided with a recess 82 in which is located a pivoted cam or leverlike arrangement 84, the said pivot being noted by the numeral 86.

The structure of FIGURES 5 to 9 may be provided with a ring section (not shown) corresponding to the ring section 11 shown in FIGURE 2, which ring section will be dropped into grooves 88 when it is desired to drive the ring 58, and with the parts as shown in FIGURE 2.

The opposite end of the spring 74 from that which engages the projection 72 is connected to the free end of the lever 84.

It will be understood that the parts corresponding to levers 24 and 26 and their pivotal connections with the blocks 90 and 92 and bowl 60 are the same as the structures shown in FIGURES 1 and 3, and their description will hence not be repeated. Additionally, the locking connection between the blocks 90 and 92 and the locking block 62 are the same as that shown in FIGURES 1 to 3 herein, and their description will not be repeated.

Figure 6:
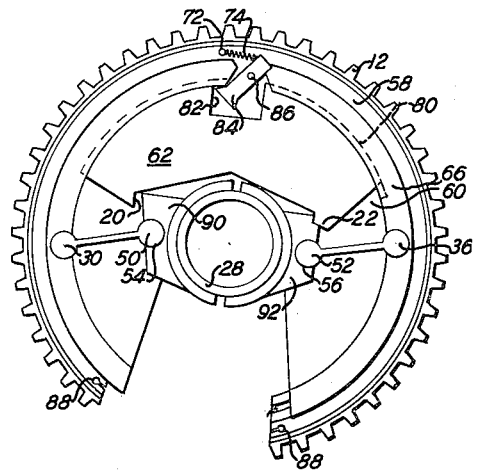
FIGURE 6 is a view similar to FIGURE 5 but showing the jaws in closed position.
Figure 9:
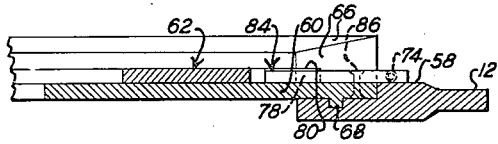
FIGURE 9 is a section on the line 9—9 of FIGURE 5.

By reference to FIGURE 7 it will be noted that the bowl 60 is provided with an opening 94 corresponding to the openings in the ring and gear, but the opening of the gear will be closed after the parts have reached the position shown in FIGURE 6. At this time the levers of both forms of the invention corresponding to levers 24 and 26 of FIGURES 1 to 3 and the levers shown in FIGURES 5 and 6 are moved so as to cause the jaws to be in proper position for engaging the work, such as the pipe or casing. When the gear is then rotated, in either form of the invention, the jaws will grasp the work and rotate it with a positive force, at which time the grasping jaws assume the positions shown in FIGURES 2, 3 or 6. It will be further understood that while the construction shown in FIGURES 5 and 6 is adapted for rotation in both directions, for purposes of clarity the showing of the bowl rotating in both directions, as seen in FIGURES 2 and 3, has been omitted, and only the clockwise rotation is shown in FIGURE 6.

When the jaws grasp the pipe or casing 28 of the structure shown in FIGURES 5 and 6, the jaws become as in FIGURES 1 and 2 part of a locked toggle and they do not pass beyond the position where the centers of the lever supports and the centers of the pipes are out of alignment. When the jaws reach the seat position, as illustrated for instance in FIGURES 2, 3 and 6, they are assisted by the locking blocks illustrated at 18 and 62 in the drawings.

Referring now to FIGURES 5 and 6 in particular, when the gear 58 starts its rotation in a clockwise direction, assuming the jaws have been placed in engagement with the pipe or casing, the jaws take hold of the pipe or casing, and the bowl 60 and locking block 62 will not be moved until the parts reach the position shown in FIGURE 6 with the lever or cam 84 positively connecting the gear ring 58 and locking block 62. When the rotation of the gear is stopped and the jaws are released from the pipe or casing, the spring 74 will assist in returning the parts to the position shown in FIGURE 5, inasmuch as the said spring is under tension when in the position shown in FIGURE 6 and its compression will return the parts to their non-operative positions, thus realigning the parts as shown in FIGURE 5.

It will be understood further that the relative rotations of the block 62 and bowl 60 are very small, and a complete grasp is obtained on the pipe grasping blocks 90 and 92 just prior to the limit of movement of the tongue 78 in the groove 80.

The force exerted against the blocks represented by numerals 38 and 40 in FIGURES 1 to 3 and 90 and 92 in FIGURES 5 and 6 by the locking block 18 or 62, respectively, is increased by the rotation of the levers as illustrated by the angles "X" and "Y" in FIGURE 3. These angles are also present in the structures of FIGURES 5 and 6, although not shown. The amount of grasping force utilized will be automatically adjusted to prevent slippage of the tube, due to the location of the levers as illustrated by the angles "X" and "Y." This is especially true when the locking levers 24 and 26 are connected directly to the prime mover. The amount of grasping force developed by the levers 24 and 26 and locking block 18 or 62 is independent of the frictional forces presented by the concave jaw piece faces and the external circumference of the pipe, thus eliminating the need for teeth in the jaw piece faces to improve the grasp on the pipe, although there may be occasions where we desire to use teeth on the inner grasping faces of the jaw pieces. Furthermore it will be noted that when the ring is rotated in the opposite direction, the leverage system is reversed thereby to obtain rotation in the opposite direction without inverting the apparatus or otherwise changing the plane of operation and without interchange of parts.

The scope of this invention includes a starting and stopping device for a cylindrical member such as a tube rotating apparatus, hand wrenches, brakes, rotary tables for oil and other types of well drills, tubing tongs, casing tongs, drill pipe tongs, single and double acting clutches, chucks, rotary slips and all structures for gripping tubes, drums as brake and clutch drums and other cylindrical objects; that the gripping surfaces of the jaws may be or may not be provided with gripping teeth, depending to some extent at least on the use to which the device is to be put and the size and thickness of the tube walls; and that the drawings and description are furnished for illustrative purposes, applicants being limited only to the extent set out in the appended claims.

The above description and drawings disclose two embodiments of the invention, and specific language has been used in describing the several figures. It will, nevertheless, be understood that no limitations of the scope of the invention are thereby contemplated, and that various alterations and modifications may be made such as would occur to one skilled in the art to which the invention relates.

We claim:

1. A tube rotating apparatus comprising a ring having means thereon for rotating the same, a plurality of shoes having surfaces for engagement with a pipe, lever means connecting said shoes to said ring, said lever means including a plurality of pivoted means, a locking block interconnected with said ring and relatively rotatable therewith having means thereon for engagement with one of said shoes when the locking block is rotated.

2. A tube rotating apparatus comprising a ring having means thereon for rotating the same, a plurality of shoes having surfaces for engagement with a pipe, lever means connecting said shoes to said ring, said lever means including a plurality of pivoted means, and a locking block interconnected with said ring and relatively rotatable therewith having means thereon for engaging one of said shoes when the locking block is rotated in one direction and for engaging another of said shoes when the locking block is rotated in the opposite direction.

3. A tube rotating apparatus comprising a ring having means thereon for rotating the same, a plurality of shoes having surfaces for engagement with a pipe, lever means connecting said shoes to said ring, said lever means including a plurality of pivoted means, and a locking block interconnected with said ring and relatively rotatable therewith and including means for engagement with one of said shoes when the locking block moves relative to said ring.

4. The structure of claim 1 wherein said locking block engaging means comprises at least one notch and a shoulder on said shoe.

5. The structure of claim 2 wherein said locking block engaging means includes a notch, one of said shoes having a shoulder for engaging the notch, said locking block having a second notch, and said other shoe having a shoulder for engaging said second notch.

6. The structure of claim 1 wherein said pivot means includes a cylindrical socket in said ring and a cylindrical socket in a shoe, said lever means having a substantially cylindrical head engageable with said socket in said shoe and a cylindrical base engageable with the cylindrical socket in said ring.

7. The structure of claim 3 wherein said pivot means includes two cylindrical sockets in said ring and a cylindrical socket in each shoe, said lever means having substantially cylindrical heads engageable with said sockets in said shoes and cylindrical bases engageable with the cylindrical sockets in said ring.

8. The structure of claim 1 wherein said ring means comprises a bowl.

9. The structure of claim 2 wherein said ring means comprises a bowl.

10. The structure of claim 1 wherein said ring rotating means has a plurality of peripheral teeth, said ring further including a split ring having a removable section and means connecting said ring section to said split ring.

11. The structure of claim 2 wherein said ring rotating means has a plurality of peripheral teeth, said ring further including a split ring having a removable ring section and means connecting said ring section to said split ring.

12. The structure of claim 1 wherein said ring rotating means comprises gear means having teeth, a bowl having a tongue and groove connection therewith, a lever pivoted on said bowl, said locking block having means adapted to be engaged by said lever, and a spring having one of its ends connected to said gear means and the other of its ends connected to said lever.

13. The structure of claim 2 wherein said ring rotating means comprises gear means having teeth, a bowl having a tongue and groove connection therewith, a lever pivoted on said bowl, said locking block having means adapted to be engaged by said lever, and a spring having one of its ends connected to said gear means and the other of its ends connected to said lever.

References Cited in the file of this patent

UNITED STATES PATENTS

| | | |
|---|---|---|
| 748,016 | Roberts | Dec. 29, 1903 |
| 1,502,726 | Lavoie | July 29, 1924 |
| 1,902,375 | Pitter | Mar. 21, 1933 |
| 2,263,267 | Franklin | Nov. 18, 1941 |
| 2,566,561 | Edelberg | Sept. 4, 1951 |
| 2,580,680 | Hillman | Jan. 1, 1952 |